No. 793,795. Patented July 4, 1905.

UNITED STATES PATENT OFFICE.

HOWARD E. MARSH, OF LOS ANGELES, CALIFORNIA, ASSIGNOR OF ONE-HALF TO WILLIAM P. WAGY, OF LOS ANGELES, CALIFORNIA.

BRIQUET AND PROCESS OF MAKING SAME.

SPECIFICATION forming part of Letters Patent No. 793,795, dated July 4, 1905.

Application filed May 25, 1904. Serial No. 209,749.

*To all whom it may concern:*

Be it known that I, HOWARD E. MARSH, a citizen of the United States of America, residing in the city of Los Angeles, in the county of Los Angeles, State of California, have invented a certain new and useful Improvement in Briquets and Processes of Making the Same, of which the following is a specification.

This invention relates to fuel-briquets, and has for its object the provision of a simple, cheap, and efficient composition from which fuel-briquets may be made, which, while thoroughly combustible and adapted to generate great heat, may be readily handled and which will not disintegrate and which shall be waterproof, so that though drenched with or soaked in water the briquets will not become water-logged, but will at all times remain in perfect condition for consumption, presenting a hardened and glazed body.

The composition consists in powdered or fine coal moistened by a solution of gelatin and bichromate of potash, such solution being preferably formed of sixteen parts of water to one part of gelatin and one part of bichromate of potash. The moistening may be to any preferred degree. The moistened product is then placed in molds of the ordinary or any preferred construction and subjected to pressure in such molds, thereby pressing out any superabundance of the solution. The pressed product is then dried either in a kiln or by simply subjecting the product to the atmosphere. If desired, ninety-eight parts of fine coal or coal-dust may be mixed with two parts of lime or gypsum and the mass thus formed moistened with the gelatin and bichromate-of-potash solution; but the preferable composition is secured without the addition of the lime or gypsum. It is of the utmost importance that the gelatin and bichromate of potash shall be combined in a single solution before either of these elements are admixed with the powdered or fine coal, as an entirely different result is secured by the admixture of a solution of combined gelatin and bichromate of potash in substantially the proportions named with the coal than is secured if a solution of gelatin or a solution of bichromate of potash is first mixed with the coal and then a solution of the other chemical added. This marked difference is apparent from the fact that by thus making a combined solution of gelatin and bichromate of potash and then admixing the combined solution with the powdered coal a product is formed which readily hardens and which product, although soaked in water after such hardening, will not dissolve in the water. Practical tests have been made by me of briquets manufactured by this formula, and I have soaked briquets manufactured by this formula in water for a period of over six weeks without any disintegration or dissolving of the briquets.

The finished and dried briquets thus produced will be found to be thoroughly waterproof and to be hard and glazed throughout. The briquets will burn readily and substantially all thereof will be consumed. If the lime or gypsum be added, the non-combustible portion will be substantially one per cent. of the briquets.

The solution or mixture of substantially equal parts of gelatin and bichromate of potash with water hardens so rapidly that it must be used directly after mixing—that is to say, as soon as the gelatin, bichromate of potash, and water are thoroughly mixed the mixture should be added to the finely-divided coal or coal and lime, or gypsum. The resulting product when molded will harden or set very quickly without the use of heat.

The briquets thus produced are readily handled, as the same will possess a hard and thoroughly composite body not liable to disintegrate and which will not absorb moisture.

It has been found that all coal contains a certain percentage of creosote and lime. By using a surplus of bichromate of potash it is found that a chemical reaction takes place between these constituents, the surplus or excess of bichromate of potash taking up the creosote. It is also found that where lime is used or where there is lime present in the coal in material quantities the lime in slaking would eat up the gelatin before chemical action could take place between the bichromate of potash and gelatin. The excess of bichromate of potash, in combination with the lime, absorbs all creosote, and the surplus or excess of bichromate of potash also acts as a fluxing agent in the burning of the briquet. Bichromate of potash alone fuses at a very much lower temperature than does bichromate of potash admixed with creosote and lime, and creosote and lime also fuse at a much lower temperature than when mixed with such bichromate of potash.

In the appended claims by the term "solution of gelatin and bichromate of potash" I refer to and intend to specify a solution formed by the admixture of bichromate of potash and gelatin, which solution is formed before either the bichromate of potash or gelatin is mixed with the coal or lime, as by such formation of a solution of bichromate of potash and gelatin a different chemical effect is produced than if the the bichromate of potash or the gelatin were separately mixed with the coal.

What I claim is—

1. A briquet composition comprising coal moistened by a solution of gelatin and bichromate of potash in substantially equal parts, substantially as set forth.

2. A briquet composition comprising fine coal moistened by a solution of substantially sixteen parts of water and one part of gelatin and one part of bichromate of potash.

3. The method of making briquets which consists of moistening fine coal with a solution of gelatin and bichromate of potash in substantially equal proportions, and pressing and drying the product.

4. A briquet comprising coal and lime or gypsum thoroughly intermingled and moistened by a solution of gelatin and bichromate of potash in substantially equal parts, substantially as set forth.

5. A briquet composition comprising substantially ninety-eight parts of fine coal and two parts of lime or gypsum thoroughly mixed and moistened by a solution of substantially sixteen parts of water and one part of gelatin and one part of bichromate of potash.

6. The method of making briquets which consists of mixing fine coal and lime or gypsum, moistening the mixture with a solution of gelatin and bichromate of potash in substantially equal proportions, and pressing and drying the product.

7. The method of making briquets which consists in forming a mixture of substantially equal parts of gelatin and bichromate of potash with water, adding the mixture to fine coal, and pressing and drying the product.

8. The method of making briquets which consists in forming a mixture of substantially equal parts of gelatin and bichromate of potash with water, adding the mixture to fine coal, or lime, or gypsum, and pressing and drying the product.

9. A briquet composition comprising fine coal the particles of which are held together by a mixture of gelatin and bichromate of potash in substantially equal proportions.

10. A briquet composition comprising fine coal and a binding material consisting of gelatin and bichromate of potash in substantially equal proportions.

In testimony whereof I have signed my name to this specification, in the presence of two subscribing witnesses, at Los Angeles, in the county of Los Angeles and State of California, this 20th day of May, 1904.

HOWARD E. MARSH.

Witnesses:
FREDERICK S. LYON,
WILLIAM P. WAGY.